(12) United States Patent
Mayr

(10) Patent No.: US 6,827,319 B2
(45) Date of Patent: Dec. 7, 2004

(54) APPARATUS FOR QUICK FIXATION OF A DEVICE TO A TRIPOD HEAD

(75) Inventor: Werner Mayr, Hall (AT)

(73) Assignee: Swarovski Optik K.G. (AT)

( * ) Notice: Subject to any disclaimer, the term of this patent is extended or adjusted under 35 U.S.C. 154(b) by 4 days.

(21) Appl. No.: 10/429,306

(22) Filed: May 5, 2003

(65) Prior Publication Data
US 2003/0218108 A1 Nov. 27, 2003

(30) Foreign Application Priority Data
May 23, 2002 (EP) .............................................. 02011356

(51) Int. Cl.[7] .............................................. F16M 11/04
(52) U.S. Cl. .................................... 248/187.1; 396/428
(58) Field of Search ........................... 248/177.1, 187.1; 403/381, 322.4; 396/419, 425, 428; 280/611, 613, 616, 617, 618

(56) References Cited

U.S. PATENT DOCUMENTS

| | | | | |
|---|---|---|---|---|
| 2,351,386 A | * | 6/1944 | Zucker | 108/143 |
| 2,482,708 A | * | 9/1949 | Gordinier | 269/232 |
| 2,834,567 A | * | 5/1958 | Young | 248/187.1 |
| 3,356,325 A | | 12/1967 | Schnase | 248/187.1 |
| 3,429,543 A | * | 2/1969 | Mooney | 248/346.04 |
| 3,612,462 A | * | 10/1971 | Mooney et al. | 248/316.4 |
| 4,244,547 A | * | 1/1981 | Kooi | 248/180.1 |
| 4,979,709 A | * | 12/1990 | Ishikawa | 248/187.1 |
| 5,429,332 A | * | 7/1995 | Ishikawa | 248/187.1 |
| 6,371,424 B1 | * | 4/2002 | Shaw | 248/222.12 |

* cited by examiner

Primary Examiner—Korie Chan
(74) Attorney, Agent, or Firm—Fredrikson & Byron, P.A.

(57) ABSTRACT

For quick fixation of a connection plate (2) fastened to a device to a tripod head (1), the tripod head (1) has on the upper side a groove (3) into which the connection plate (2) is insertable with one side. Further, a clamping jaw (5) is provided that engages over the opposite side of the connection plate (2) in the closed position. The clamping jaw (5) is fastened so as to be tiltable about an axle (8) parallel to the connection plate plane to a slider (9) that is displaceable by pressure with the connection plate (2) against the force of a spring (11), it being locked by a bolt (14) loaded with springs (23) when the clamping jaw (5) tilted onto the connection plate (2) in the closed position.

14 Claims, 2 Drawing Sheets

APPARATUS FOR QUICK FIXATION OF A DEVICE TO A TRIPOD HEAD

BACKGROUND OF THE INVENTION

This invention relates to an apparatus for quick fixation of a connection plate fastened to a device to a tripod head having on the upper side a groove into which the connection plate is insertable with one side, and a clamping jaw that engages over the opposite side of the connection plate in the closed position.

Such a quick fixation apparatus is known for example from U.S. Pat. No. 3,356,325. On the underside of the connection plate there is a downwardly flared disk that is inserted with one side into the groove on the tripod head, while the clamping jaw is formed by a cam disk spring-loaded in the closed position and slewable into the open position with a handle.

The known quick fixation apparatus is only operable with both hands. That is, the optical device, for example a camera or telescope, must be held with one hand while the cam disk is turned back with the other hand. Moreover, dirt between the cam disk and the conic disk on the underside of the connection plate can hinder the rotation of the cam disk, which leads to incomplete clamping of the conic disk and thus to deficient fixation of in particular heavy optical devices.

The problem of the invention is to provide an apparatus operable with one hand for rapid and safe fastening of even heavy devices to a tripod.

SUMMARY OF THE INVENTION

This is obtained according to the invention by fastening the clamping jaw so as to be tiltable about an axle parallel to the connection plate plane to a slider that is displaceable by pressure with the connection plate against a spring force and lockable in the closed position by a spring-loaded bolt when the clamping jaw is tilted onto the connection plate.

According to the invention, the device thus only needs to be held with one hand and urged against the spring-loaded slider for quick fixation. The second hand is thus not required for quick fixation. The slider can be formed by a ledge, bolt or the like which is displaceable.

Like the one rigid groove on the upper side of the tripod head, the tiltable clamping jaw preferably also has a groove that engages over the relevant connection plate surface when the clamping jaw is tilted inward.

For insertion into the one groove or for engagement by the groove in the clamping jaw, the preferably rectangularly formed connection plate preferably has on each relevant mutually opposing side a foot that extends downwardly obliquely outwardly on its outer side. This guarantees a reliable hold of the connection plate in the two grooves due to the wide bearing surface.

For tilting the clamping jaw onto the connection plate or one foot thereof, an oblique support surface is provided on the tripod head against which the clamping jaw lies with its outer side when the slider is moved.

For the slider to be displaced so far that the clamping jaw clamps the connection plate or foot thereof, an oblique groove or similar recess is provided in the slider which the bolt engages with a nose or similar engaging portion while displacing the slider away from the connection plate.

Preferably, the recess has two parallel oblique surfaces which the nose or similar engaging portion of the bolt engages with two oblique surfaces parallel thereto.

Said oblique surfaces are preferably so formed that self-clamping prevails, thereby preventing self-acting opening of the quick fixation apparatus.

For actuating the bolt, a two-armed lever is preferably provided whose one arm is formed as a handle while the second arm is linked to a rod connected with the bolt.

A large transformation ratio is thus formed between the handle and the bolt, thereby permitting the bolt to act upon the slider with high spring force so that a high clamping force acts on the connection plate.

The handle is preferably folded against the tripod head in the closed position of the quick fixation apparatus in order to obtain small overall dimensions.

Instead of the handle or actuating lever, another handling means, for example a push-button, can also be provided for actuating the bolt.

Flanks for guiding the connection plate are provided on the groove into which the connection plate or foot thereof is insertable. This at the same time forms a reliable hold in all directions by shape mating.

The slider, bolt, springs provided for spring loading the slider and bolt, and rod connected with the operating lever are preferably disposed in space-saving and functionally reliable fashion within the tripod head housing below the connection plate.

DESCRIPTION OF THE DRAWINGS

In the following, an embodiment of the inventive apparatus will be explained in more detail by way of example with reference to the drawing, in which.

DETAILED DESCRIPTION OF THE PREFERRED EMBODIMENTS

Figure 1:
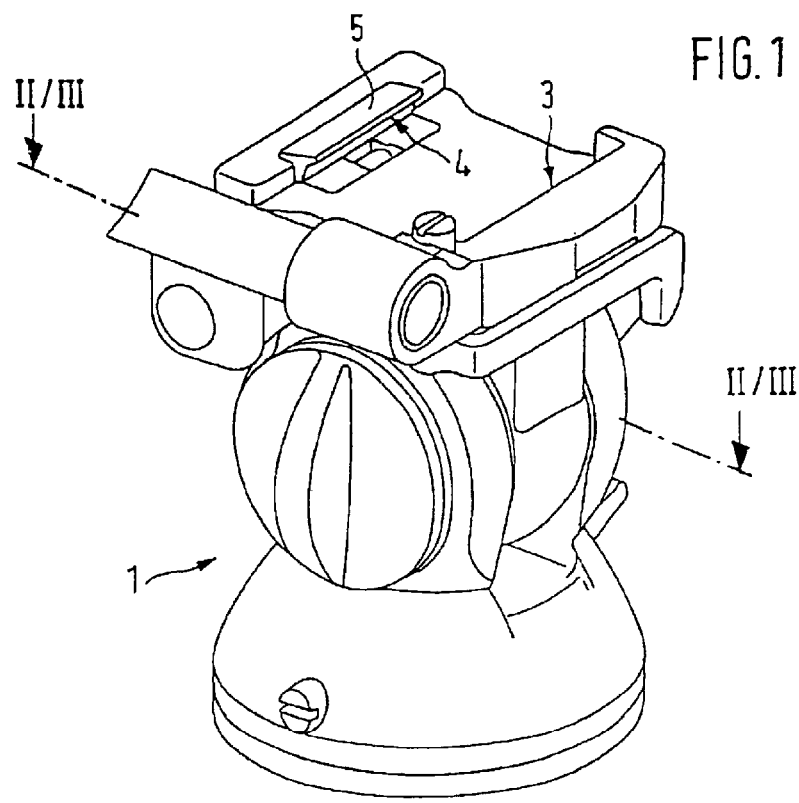
FIG. 1 shows a perspective view of a tripod head.
Figure 2:
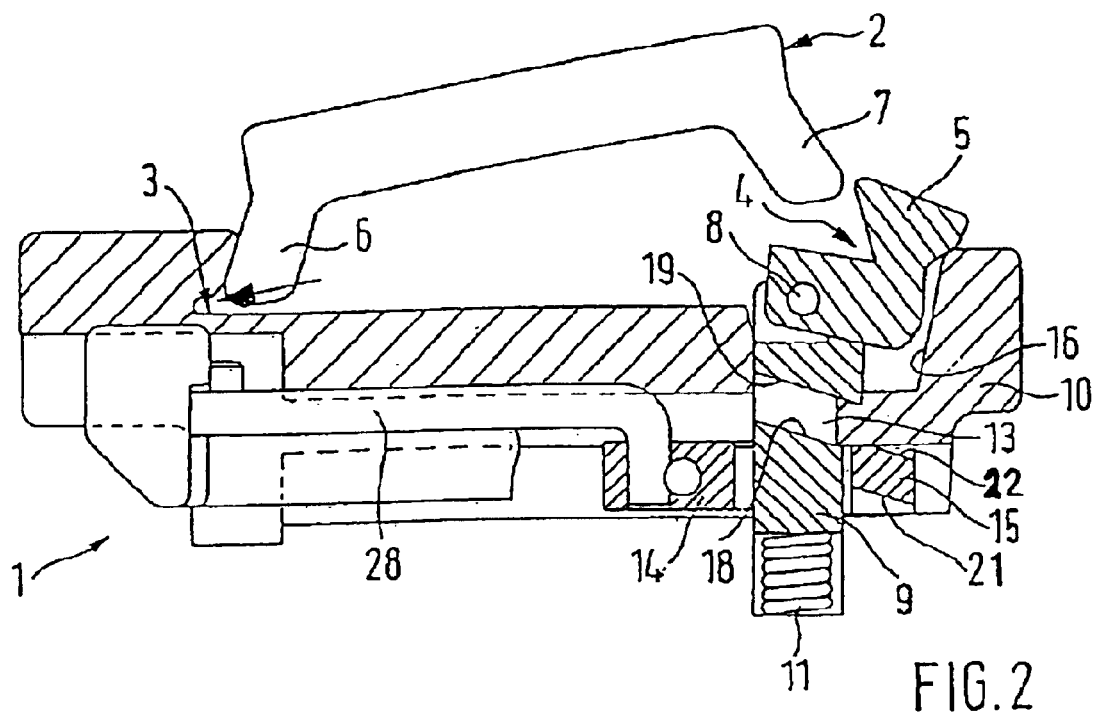
FIGS. 2 and 3 show sections through the tripod head along line 11/111 in FIG. 1 with the connection plate in the open and closed positions.
Figure 3:
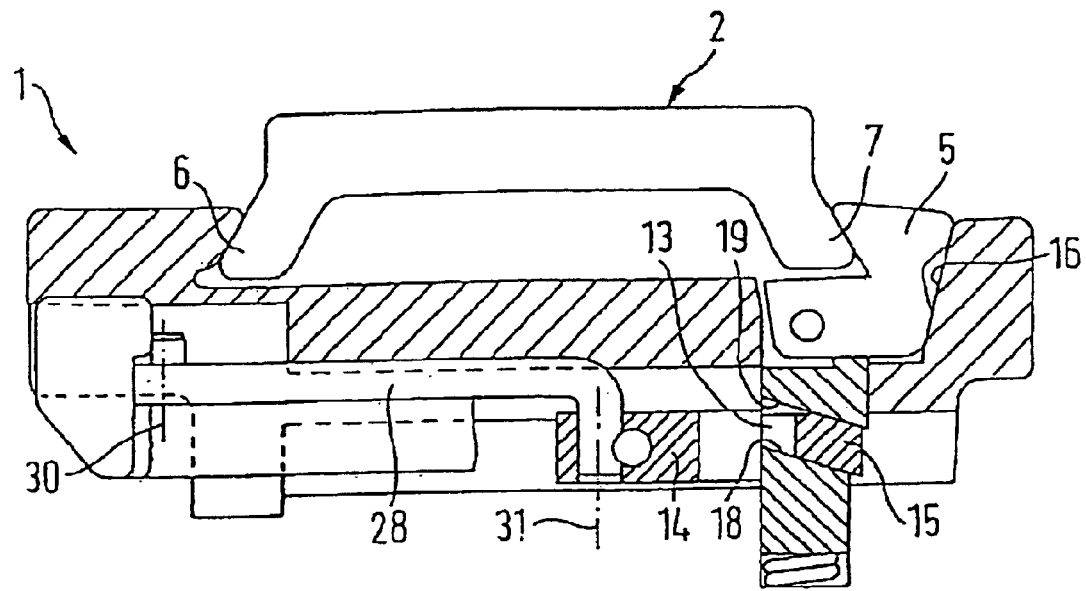

According to FIGS. 1 to 3, tripod head 1 slewable about a horizontal and a vertical axis and fixable in the adjusted swivel and tilt position is formed on a tripod (not shown) for quick fixation of connection plate 2 to which the device (not shown), for example a telescope or camera, is fastened.

Tripod head 1 has on its upper side groove 3 on one side of connection plate 2 and second groove 4 on the other side of connection plate 2. While groove 3 is formed rigidly on tripod head 1, groove 4 is provided on the inside of clamping jaw 5.

For insertion into groove 3 or for engagement by groove 4 in clamping jaw 5, rectangular connection plate 2 preferably has on each relevant, mutually opposing side foot 6, 7 extending downwardly and obliquely outwardly on the outer side.

Clamping jaw 5 is fastened to slider 9 so as to be tiltable about axle 8 that is horizontal, that is, parallel to the plane of connection plate 2.

Slider 9 formed for example as a ledge is slidably guided in the interior of housing 10 of tripod head 1. Compression spring 11 loads slider 9.

Slider 9 has groove or similar recess 13 which bolt 14 formed for example as a ledge engages with nose or similar engagement portion 15 when slider 9 has been moved with connection plate 2 so far that clamping jaw 5 is tilted onto foot 7 to lock connection plate 2.

For tilting clamping jaw 5 onto foot 7, oblique support surface 16 is provided on tripod head 1. Clamping jaw 5 lies with its outer side against support surface 16 when slider 9 is moved by the pressure of connection plate 2 to be fixed.

For slider 9 to be displaced so far that clamping jaw 5 clamps foot 7, groove or similar recess 13 has in the slider two parallel oblique surfaces 18, 19 which bolt 14 engages with its engagement portion 15 with virtually parallel oblique surfaces 21, 22.

Oblique surfaces 18, 19 and 21, 22 are preferably formed so that self-locking prevails, thereby preventing self-acting opening of the quick fixation apparatus.

Bolt 14 displaceably mounted in housing 10 of tripod head 1 engages with its engagement portion 15 the side of slider 9 opposite rigid groove 3 on the upper side of tripod head 1. According to FIG. 4, bolt 14 is loaded in the locked position by two extension springs 23.

Figure 4:
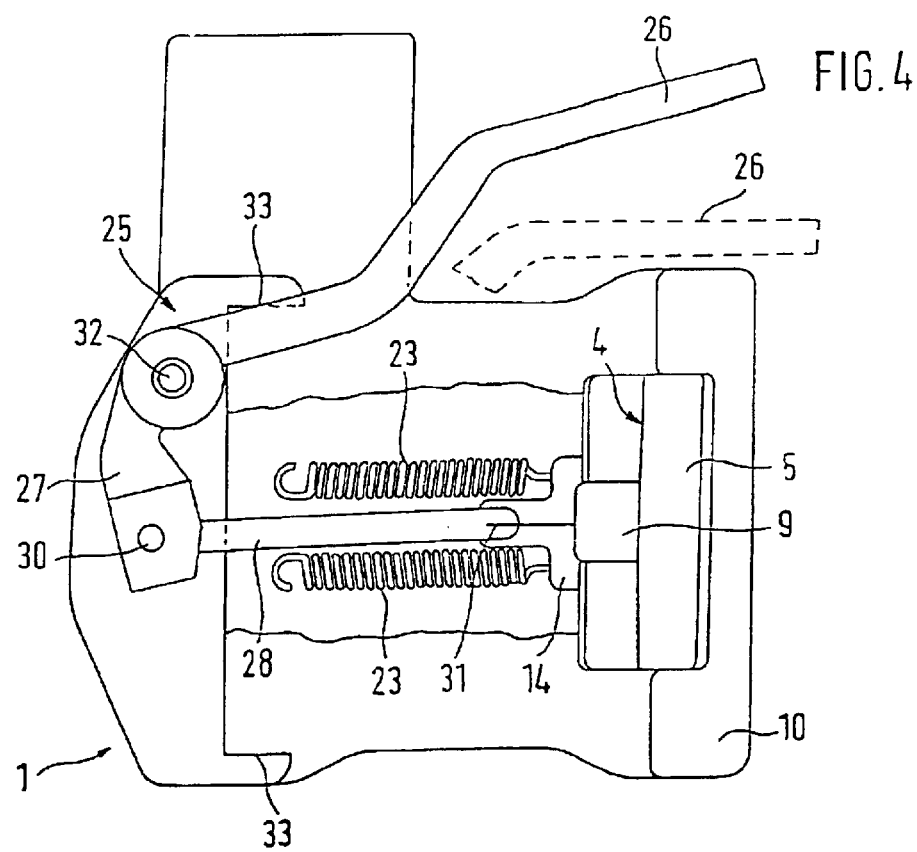
FIG. 4 shows a plan view of the tripod head with partially broken-away parts.

To actuate bolt 14, two-armed lever 25 is mounted in tripod head housing 10 according to FIG. 4, its one arm forming operating lever 26 while the other, short arm 27 is linked to rod 28 that acts upon bolt 14 in articulated fashion. Articulated axles 30, 31 of rod 28 extend parallel to lever axle 32. As shown by dashed lines in FIG. 4, operating lever 26 is folded against tripod head housing 10 in the closed position when slider 9 is locked.

Flanks 33 for guiding connection plate 2 are provided on rigid groove 3 at both ends.

What is claimed is:

1. An apparatus for quick fixation of a connection plate (2) fastened to a device, to a tripod head (1), the connection plate having opposed sides (6,7), the apparatus comprising:

an upper side having a groove (3) into which the connection plate (2) is insertable on one side (6);

a tiltable clamping jaw (5) which tilts to engage the jaw over the opposite side (7) of the connection plate (2);

a slider (9) coupled to the jaw (5) through an axle (8) and spring biased (11) to urge the jaw (5) to disengage the connection plate opposite side (7), such that the slider (9) is slidably displaced responsive to the plate opposite side (7) bearing against the jaw (5) coupled through the axle (8) to the slider (9); and a spring biased (23) bolt (14) having an engaging portion (15) to engage the slider (9) in a locked position, wherein the slider (9) has an oblique surface (18) which the bolt (14) acts upon when locking with the engaging portion (15) with a parallel oblique surface (21).

2. An apparatus according to claim 1, characterized in that the slider (9) has a recess (13) with two parallel oblique surfaces (18, 19) which the engaging portion (15) of the bolt (14) acts upon with two oblique surfaces (21, 22) parallel thereto.

3. An apparatus according to claim 2, characterized in that the oblique surfaces (18, 19, 21, 22) are formed to be self-locking.

4. An apparatus according to claim 1, characterized in that the engaging portion (15) of the bolt (14) engages the slider (9) from the side opposite the groove (3) of the tripod head (1).

5. An apparatus according to claim 4, characterized in that the bolt (14) is loaded in the locked position by at least one extension spring (23).

6. An apparatus for quick fixation of a connection plate (2) fastened to a device, to a tripod head (1), the connection plate having opposed sides (6,7), the apparatus comprising:

an upper side having a groove (3) into which the connection plate (2) is insertable on one side (6);

a tiltable clamping jaw (5) which tilts to engage the jaw over the opposite side (7) of the connection plate (2);

a slider (9) coupled to the jaw (5) through an axle (8) and spring biased (11) to urge the jaw (5) to disengage the connection plate opposite side (7), such that the slider (9) is slidably displaced responsive to the plate opposite side (7) bearing against the jaw (5) coupled through the axle (8) to the slider (9); and a spring biased (23) bolt (14) having an engagement portion (15) to engage the slider (9) in a locked position; and one arm (26) of a two-armed lever (25) whose second arm (27) acts upon the bolt (14) via a rod system (28) to disengage engagement portion (15) from slider (9) by opposing the spring force on bolt (14).

7. An apparatus according to claim 6, characterized in that the one lever arm formed as an operating lever (26) is folded against the tripod head housing (10) in the closed position when the slider (9) is locked.

8. An apparatus for quick fixation of a connection plate to a tripod head, where the connection plate is coupled to a device, the connection plate having opposed sides, the apparatus comprising:

an upper side having a groove for receiving one side of the connection plate;

a clamping jaw for receiving the connection plate opposite side;

a slider element pivotally coupled to the clamping jaw through an axle and biased to unclamp the clamping jaw from the connection plate opposite side; and an engagement member biased to bear against the slider element, in which the slider element and engagement member are cooperatively adapted to latchably engage each other; and wherein the slider element having a recess for receiving the engagement member, such that when the engagement member is received within the recess, the slider element is latched to inhibit travel that would unclamp the clamping jaw from the connection plate opposite side.

9. The apparatus of claim 8, further comprising a first recess camming surface and a first engagement member camming surface is configured in opposed relation to each other when the engagement member is disposed within the recess, such that the engagement member biasing force urging the engagement member into the recess urges the slider member to clamp the jaw against the connection plate opposite side.

10. The apparatus of claim 9, further comprising a second recess camming surface and a second engagement member camming surface configured in opposed relation to each other when the engagement member is disposed within the recess, such that urging the engagement member out of the recess urges the slider member to unclamp the jaw from the connection plate opposite side.

11. The apparatus of claim 10, in which the slider element second camming surface and the recess second camming surface are parallel to each other.

12. The apparatus of claim 9, in which the slider element first camming surface and the recess first camming surface are parallel to each other.

13. The apparatus of claim 8, in which the clamping jaw includes a jaw camming surface, further comprising a housing camming surface disposed in opposed relation to the jaw camming surface, such that urging the connection plate opposite side against the jaw urges the jaw to tilt and clamp the connection plate opposite side.

14. The apparatus of claim 8, in which the engagement member biasing force against the slider element includes a spring applying a force against the engagement member, the apparatus further comprising a lever having a first arm for manual operation and a second arm operably coupled to the engagement member to provide an opposing force to counteract the spring force to disengage the engagement member from the recess and allow the biased slider element to travel to unclamp the jaw.

* * * * *